US012296614B2

(12) United States Patent
Ukpabi et al.

(10) Patent No.: US 12,296,614 B2
(45) Date of Patent: May 13, 2025

(54) PERSONALIZED IDENTIFICATION DOCUMENT PROCESSING SYSTEMS AND METHODS

(71) Applicant: Entrust Corporation, Shakopee, MN (US)

(72) Inventors: Pauline Ukpabi, Shakopee, MN (US); Roman Knipp, Shakopee, MN (US); Utpal Vaidya, Shakopee, MN (US); Ryan Schwiderski, Shakopee, MN (US); Matthew Stebbins, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 0 days.

(21) Appl. No.: 18/459,187

(22) Filed: Aug. 31, 2023

(65) Prior Publication Data

US 2024/0075764 A1 Mar. 7, 2024

Related U.S. Application Data

(60) Provisional application No. 63/374,300, filed on Sep. 1, 2022.

(51) Int. Cl.
*B42D 25/00* (2014.01)
*B42D 25/23* (2014.01)
*B42D 25/455* (2014.01)

(52) U.S. Cl.
CPC .......... *B42D 25/455* (2014.10); *B42D 25/23* (2014.10)

(58) Field of Classification Search
CPC .............................. B42D 25/455; B42D 25/23
See application file for complete search history.

(56) References Cited

U.S. PATENT DOCUMENTS

| | | | |
|---|---|---|---|
| 4,825,054 | A | 4/1989 | Rust et al. |
| 4,995,501 | A | 2/1991 | Lundstrom et al. |
| 5,266,781 | A | 11/1993 | Warwick et al. |

(Continued)

FOREIGN PATENT DOCUMENTS

| | | | |
|---|---|---|---|
| JP | 2002187240 | A | 7/2002 |
| JP | 2002362068 | A | 12/2002 |

(Continued)

OTHER PUBLICATIONS

JP2002187240A—Recording medium, method for forming image using the same, and printed matter, 9 pages. (Year: 2024).*

(Continued)

*Primary Examiner* — Tuyen K Vo
(74) *Attorney, Agent, or Firm* — Merchant & Gould P.C.

(57) ABSTRACT

A personalized identification document processing system includes a print station that is configured as a retransfer printer with a retransfer film having a transferrable print receptive material and a transferrable radiation curable material. An image/data is printed on the transferrable print receptive material, and thereafter the print receptive material containing the printed image/data together with at least some of the transferrable radiation curable material is transferred to a surface of the plastic identification document. The radiation curable material is then cured and once cured enhances the durability of the printed image/data.

16 Claims, 7 Drawing Sheets

(56) References Cited

U.S. PATENT DOCUMENTS

| | | | | |
|---|---|---|---|---|
| 5,636,928 | A * | 6/1997 | Shiina | B41J 13/12 400/636 |
| 5,837,991 | A | 11/1998 | LaManna et al. | |
| 6,131,817 | A | 10/2000 | Miller | |
| 6,783,067 | B2 | 8/2004 | Kreuter et al. | |
| 6,902,107 | B2 | 6/2005 | Shay et al. | |
| 7,398,972 | B2 | 7/2008 | Schuller et al. | |
| 7,434,728 | B2 | 10/2008 | Paulson et al. | |
| 2002/0000286 | A1 | 1/2002 | Onishi et al. | |
| 2003/0077428 | A1 | 4/2003 | Ishida et al. | |
| 2006/0240202 | A1 | 10/2006 | Ishida | |
| 2007/0031617 | A1 | 2/2007 | Field | |
| 2007/0187870 | A1 | 8/2007 | Lundstrom et al. | |
| 2015/0118420 | A1 | 4/2015 | Yoda et al. | |
| 2018/0117905 | A1* | 5/2018 | Zaborowski | B41F 23/0476 |
| 2018/0194144 | A1* | 7/2018 | Beech | B41J 13/12 |
| 2018/0215184 | A1* | 8/2018 | Beech | B41M 3/006 |
| 2018/0345705 | A1* | 12/2018 | Lien | B41J 2/475 |
| 2019/0160846 | A1 | 5/2019 | Yoda et al. | |

FOREIGN PATENT DOCUMENTS

| | | | |
|---|---|---|---|
| JP | 2004001434 | A | 1/2004 |
| JP | 201480016 | A | 5/2014 |

OTHER PUBLICATIONS

PCT International Search Report dated Dec. 8, 2023 for International Application No. PCT/B2023/058674.

* cited by examiner

PERSONALIZED IDENTIFICATION DOCUMENT PROCESSING SYSTEMS AND METHODS

FIELD

This technical disclosure relates to processing personalized plastic identification documents such as personalized plastic cards and plastic pages of passports, and increasing the durability of printing on the personalized plastic identification documents.

BACKGROUND

Identification documents such as identification cards, credit and debit cards, driver's licenses, and the like, and passports, are personalized with information concerning the intended holder of the identification document and then issued to the intended holder. The durability of printing applied to the identification documents is important in order to extend the life of the identification documents.

SUMMARY

Personalized identification document processing systems and methods are described that produce personalized plastic identification documents with highly durable printing while minimizing print ribbon waste and maintaining document processing speeds and system throughput.

In an embodiment, a personalized identification document processing system described herein includes a print station that is configured as a retransfer printer with a retransfer film having a dry to the touch or substantially dry to the touch transferrable radiation curable material. In an embodiment, the transferrable radiation curable material may be referred to as a transferrable radiation curable protective topcoat material since the radiation curable material may form an outermost layer that is designed to protect underlying printed image/data. An image/data is printed on the retransfer film, and thereafter the printed image/data together with some of the transferrable radiation curable material is transferred to a surface of the plastic identification document. The radiation curable material is then cured and once cured enhances the durability of the printed image/data. In an embodiment, the radiation curable material is print receptive. In another embodiment, the retransfer film can have a separate print receptive layer applied over the radiation curable material.

Radiation curing of a coating increases the coating toughness. If a material to be transferred from the retransfer film is fully cured before transfer to the identification document, the material may not break cleanly around the edges of the identification document, causing undesired extra material to transfer along the identification document edges. One way of preventing transfer of such extra material is to reduce the thickness of the cured material, making it less tough. However, the reduced thickness also reduces the overall durability of the printing underlying the transferred material. To overcome this deficiency, the transferrable radiation curable material described herein is first transferred to the identification document before being radiation cured. The uncured radiation curable material being less tough, transfers to the identification document cleanly, even at a desired higher thickness, without transferring undesired extra material. The transferred radiation curable material on the identification document is then radiation cured to enhance its toughness and durability. This approach results in clean transfer of the radiation curable material while maintaining the desired durability of the final printed identification document. In addition, the dry to the touch or substantially dry to the touch radiation curable material helps prevent offset of uncured coating in the roll form and enhances defect free thermal printing.

In one embodiment, a personalized identification document processing system includes a document input that is configured to input a plastic identification document to be processed onto a document transport path to create a personalized plastic identification document, and a print station along the document transport path. The print station includes: a retransfer film with a carrier film and a dry to the touch (or substantially dry to the touch) transferrable radiation curable material on the carrier film; a thermal print head; a print ribbon that is engageable by the thermal print head to thermally transfer thermally transferrable color material from the print ribbon to the retransfer film; and a transfer station that is configured to simultaneously transfer the printed data/image and at least a portion of the transferrable radiation curable material from the retransfer film to the plastic identification document. A radiation curing station is located along the document transport path that is configured to receive the plastic identification document and apply radiation to the portion of the radiation curable material on the plastic identification document to cure the transferred portion of the radiation curable material on the plastic identification document. A document output is located along the document transport path that is configured to receive the plastic identification document after radiation curing in the radiation curing station. In addition, a document transport mechanism is provided that is configured to transport the plastic identification document along the document transport path. In an embodiment, the radiation curable material is print receptive. In another embodiment, the retransfer film can have a separate print receptive layer applied over the radiation curable material.

In another embodiment, a method of processing a plastic identification document in a personalized identification document processing system includes inputting the plastic identification document to be processed onto a document transport path, and transporting the plastic identification document into a print station located along the document transport path. The print station includes: a retransfer film with a carrier film and a dry to the touch (or substantially dry to the touch) transferrable radiation curable material on the carrier film; a thermal print head; a print ribbon that is engageable by the thermal print head to thermally transfer thermally transferrable color material from the print ribbon to the retransfer film; and a transfer station that is configured to simultaneously transfer printed data/printed image on the retransfer film together with at least a portion of the transferrable radiation curable material from the retransfer film to the plastic identification document. An image/data is printed on the retransfer film by using the thermal print head to transfer thermally transferrable color material from the print ribbon to the retransfer film. Thereafter, the printed data and at least a portion of the radiation curable material from the retransfer film are simultaneously transferred to the plastic identification document. Thereafter, the plastic identification document is transported into a radiation curing station along the document transport path, and radiation is applied to the portion of the radiation curable material on the plastic identification document to cure the portion of the radiation curable material. Thereafter, the plastic identification document is transported to a document output and the plastic identification document is output. In an embodiment, the radiation curable material is print receptive. In another embodiment, the retransfer film can have a separate print receptive layer applied over the radiation curable material.

The identification documents described herein can be personalized plastic identification cards or plastic pages of passports. Personalized plastic identification cards described herein include, but are not limited to, financial (e.g., credit, debit, or the like) cards, access cards, driver's licenses, national identification cards, and business identification cards, and other plastic identification cards that can benefit from having high durable printing described herein. In an embodiment, the plastic identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

DRAWINGS

FIG. 1 schematically depicts an example of a personalized document processing system described herein.

FIG. 2 schematically depicts another example of a personalized document processing system described herein.

Figure 12:
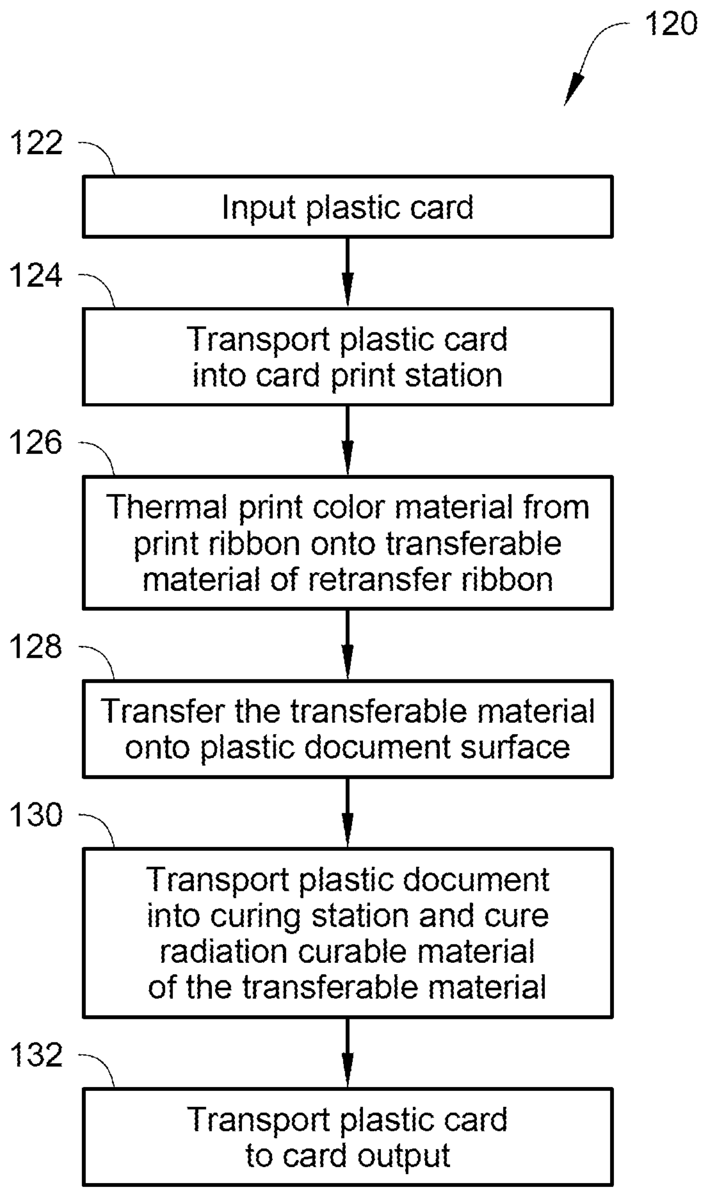

FIG. 12 schematically depicts a method of processing a plastic document in a personalized document processing system described herein.

DETAILED DESCRIPTION

Figure 1:
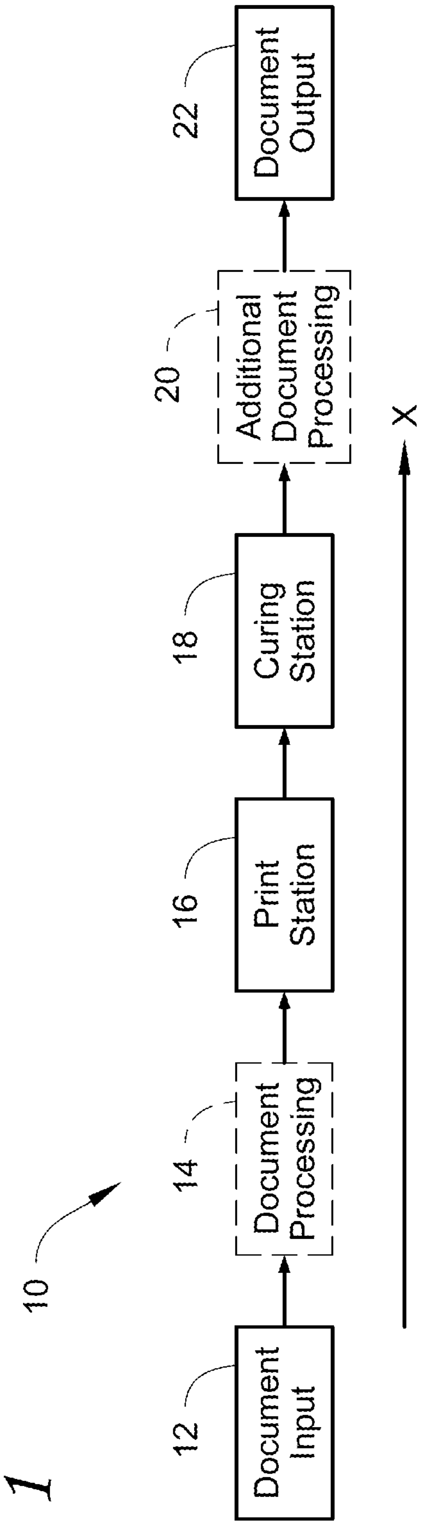
Figure 2:
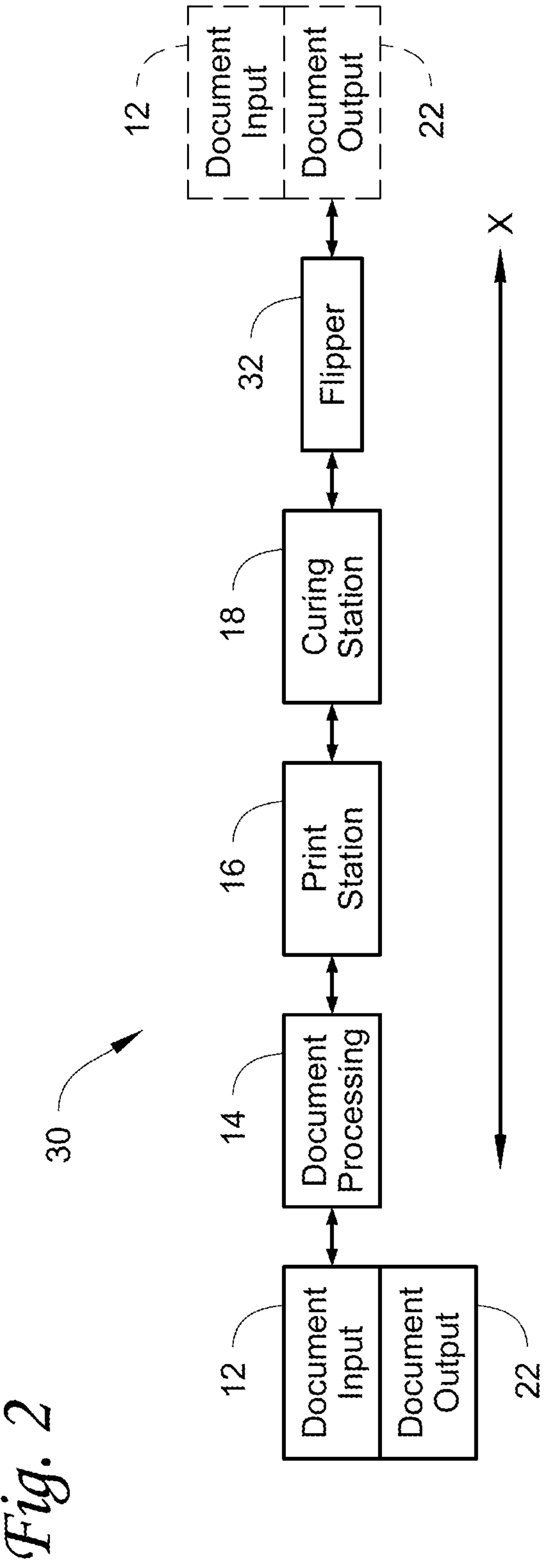

FIGS. 1 and 2 illustrate two examples of personalized identification document processing systems that can be used to produce personalized plastic identification documents. The systems output personalized plastic identification documents with highly durable printing thereon. Identification documents include personalized plastic identification cards and plastic pages of passports. Personalized plastic identification cards described herein include, but are not limited to, financial (e.g., credit, debit, or the like) cards, access cards, driver's licenses, national identification cards, and business identification cards, and other plastic identification cards that can benefit from having one or more security features described herein added to the plastic card. In an embodiment, the plastic identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

For sake of convenience in describing the concepts herein, the following description and the drawings describe the identification document as being a plastic card. However, as indicated above, the techniques described herein are applicable to plastic pages of passports.

The term "plastic identification document" or "plastic identification card" as used throughout the specification and claims, unless indicated otherwise, refers to identification documents such as plastic cards where the document substrate can be formed entirely of plastic, or formed of a combination of plastic and non-plastic materials. In one embodiment, the cards can be sized to comply with ISO/IEC 7810 with dimensions of about 85.60 by about 53.98 millimeters (about 3⅜ in×about 2⅛ in) and rounded corners with a radius of about 2.88-3.48 mm (about ⅛ in). As would be understood by a person of ordinary skill in the art of plastic identification cards, the cards are typically formed of multiple individual layers that form the majority of the card body or the card substrate. Similarly, the term "plastic page" of a passport refers to passport pages where the passport can be formed entirely of plastic, or formed of a combination of plastic and non-plastic materials. An example of a plastic passport page is the data page in a passport containing the personal data of the intended passport holder. The passport page may be a single layer or composed of multiple layers. Examples of plastic materials that the card or passport page, or the individual layers of the card or passport can be formed from include, but are not limited to, polycarbonate, polyvinyl chloride (PVC), polyester, acrylonitrile butadiene styrene (ABS), polyethylene terephthalate glycol (PETG), TESLIN®, combinations thereof, and other plastics. In an embodiment, the card or passport page can be formed primarily of a biodegradable material such as one or more biodegradable plastics, paper/cardboard, or other biodegradable material(s). In another embodiment, the card can be a metal card formed partially or entirely of metal.

As used herein, the term "processing" (or the like) as used throughout the specification and claims, unless indicated otherwise, is intended to encompass operations performed on a card that includes operations that result in personalizing the card as well as operations that do not result in personalizing the card. An example of a processing operation that personalizes the card is printing the cardholder's image or name on the card. An example of a processing operation that does not personalize the card is applying a laminate to the card or printing non-cardholder graphics on the card. The term "personalize" is often used in the card industry to refer to cards that undergo both personalization processing operations and non-personalization processing operations.

FIG. 1 is a schematic depiction of one embodiment of a large volume batch production document processing system 10 that can be used to process plastic identification cards (and passports) described herein. The document processing system 10 is configured to process multiple documents at the same time, with the documents being processed in sequence, with the documents proceeding generally along a document transport direction/transport path X. The type of system 10 depicted in FIG. 1 is often referred to as a central issuance processing system that processes documents in high volumes, for example on the order of high hundreds or thousands per hour, and employs multiple processing stations or modules to process multiple documents at the same time to reduce the overall per document processing time. Examples of such large volume document processing machines include the MX and MPR family of central issuance processing machines available from Entrust Corporation of Shakopee, Minnesota. Other examples of central issuance processing machines are disclosed in U.S. Pat. Nos. 4,825,054, 5,266,781, 6,783,067, and 6,902,107, all of which are incorporated herein by reference in their entirety.

The system 10 in FIG. 1 can include a document input 12, one or more optional document processing stations 14 downstream from the document input 12, a print station 16, a radiation curing station 18, one or more optional additional document processing stations 20, and a document output 22. The system 10 can include additional processing stations as would be understood by persons of ordinary skill in the art.

The document input 12 can be configured to hold a plurality of plastic cards or passports waiting to be processed and that mechanically feeds the documents one by one into the system 10 using a suitable document feeder. In one embodiment, the document input 12 can be an input hopper. In another embodiment, the document input 12 can be an input slot through which individual documents are manually or automatically fed for processing. The documents are initially introduced into the one or more optional document processing stations 14 if they are present in the system. The stations 14, if present, can include a chip testing/programming device that is configured to perform contact or contactless testing of an integrated circuit chip on each document to test the functionality of the chip, as well as program the chip. Testing the functionality of the chip can include reading data from and/or writing data to the chip. In one embodiment, the chip testing/programming device can be configured to simultaneously program the chips on a plurality of cards. The construction and operation of chip testing/programming devices in document processing systems is well known in the art. The stations 14 can also include a magnetic stripe read/write testing device (when the documents are cards) that is configured to read data from and/or encode data on a magnetic stripe on each card (if the cards include a magnetic stripe). The construction and operation of magnetic stripe read/write testing devices in document processing systems is well known in the art.

As described in further detail below with respect to FIG. 4, the print station 16 is configured to perform retransfer printing.

The curing station 18 is configured to generate and apply radiation, such as ultraviolet radiation or other radiation, to radiation curable material applied to the card in the print station 16 to cure the radiation curable material. The curing station 18 can include a curing lamp that includes at least one radiation source or radiation emitter that emits radiation. In one embodiment, the curing lamp can be formed by one or more light emitting diodes (LEDs) that emit UV light. An example of a mechanism that can generate and apply curing radiation in a card personalization system is the radiation applicator used in the DATACARD® MX8100" Card Issuance System available from Entrust Corporation of Shakopee, Minnesota The one or more additional document processing stations 20 can be stations that are configured to perform any type of additional document processing. Examples of the additional document processing stations 20 include, but are not limited to, an embossing station having an embosser configured to emboss characters on the documents, an indent station having an indenter configured to indent one or more characters on the documents, a lamination station with a laminator configured to apply one or more laminates to the documents, a security station with a security feature applicator configured to apply one or more additional security features to one or more of the surfaces of the documents, and one or more document reorienting mechanisms/flippers configured to rotate or flip a document 180 degrees for processing on both sides of the documents.

The document output 22 can be configured to hold a plurality of documents after they have been processed. In this configuration, the document output 22 is often termed a document output hopper. The construction and operation of output hoppers is well known in the art. In another embodiment, the document output 22 can be an output slot.

FIG. 2 is a schematic depiction of another embodiment of a document processing system 30 that can be used to process plastic cards (or passports). In this embodiment, the card processing system 30 can be configured as a desktop card processing system that is typically designed for relatively smaller scale, individual card personalization in relatively small volumes, for example measured in tens or low hundreds per hour, often times with a single card being processed at any one time. These card processing machines are often termed desktop processing machines because they have a relatively small footprint intended to permit the processing machine to reside on a desktop. Many examples of desktop processing machines are known, such as the SIGMA™ and ARTISTA™ family of desktop card printers available from Entrust Corporation of Shakopee, Minnesota. Other examples of desktop processing machines are disclosed in U.S. Pat. Nos. 7,434,728 and 7,398,972, each of which is incorporated herein by reference in its entirety.

In FIG. 2, elements in the system 30 that are similar in construction or functionality to elements in the system 10 in FIG. 1 are referred to using the same reference numerals. In FIG. 2, the system 30 is illustrated as including the document input 12 and the document output 22 at one end of the system 30. In the type of system depicted in FIG. 2, the document input 12 and/or the document output 22 can be provided at other locations in the system 30. For example, in one embodiment, the document input 12 can be located at a position higher up in the system, for example at the top of the system above the transport path X between the ends of the system 30. In another embodiment as depicted in dashed lines in FIG. 2, the document input 12 and the document output 22 can be located at the opposite end of the system 30.

The one or more optional document processing stations 14, the print station 16, and the curing station 18 can be arranged relative to one another in the manner indicated in FIG. 2 and as described above for FIG. 1. In an embodiment, a card flipper 32 can be provided at the end of the system 30 that is configured to flip or rotate the card 180 degrees so that the card surface previously facing upward is now facing downward, and the card surface previously facing downward is now facing upward. The card is then transported in reverse back toward the curing station 18, the print station 16 and the other processing stations for additional processing on the now upwardly facing card surface and ultimately transported to the output 22. If the card flipper 32 is not present, the card can simply be reversed in direction after curing in the curing station 18 is finished, and the card ultimately transported to the output 22.

In FIGS. 1 and 2, the curing station 18 is depicted as being downstream from the print station 16 so that after printing, the plastic card is transported to the curing station 18 for curing. In another embodiment, the curing station 18 can be located upstream of the print station 16, or the curing station 18 can be incorporated into and can be considered part of the print station 16.

In the systems 10, 30 in FIGS. 1 and 2, the documents can be transported throughout the systems 10, 30 and moved along the document transport path X by one or more suitable mechanical document transport mechanisms (not shown). Mechanical document transport mechanism(s) for transporting cards and passports in document processing equipment of the type described herein are well known in the art. Examples of mechanical document transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of document transport mechanisms that could be used, as well as the construction and operation of such document transport mechanisms.

Figure 3A:
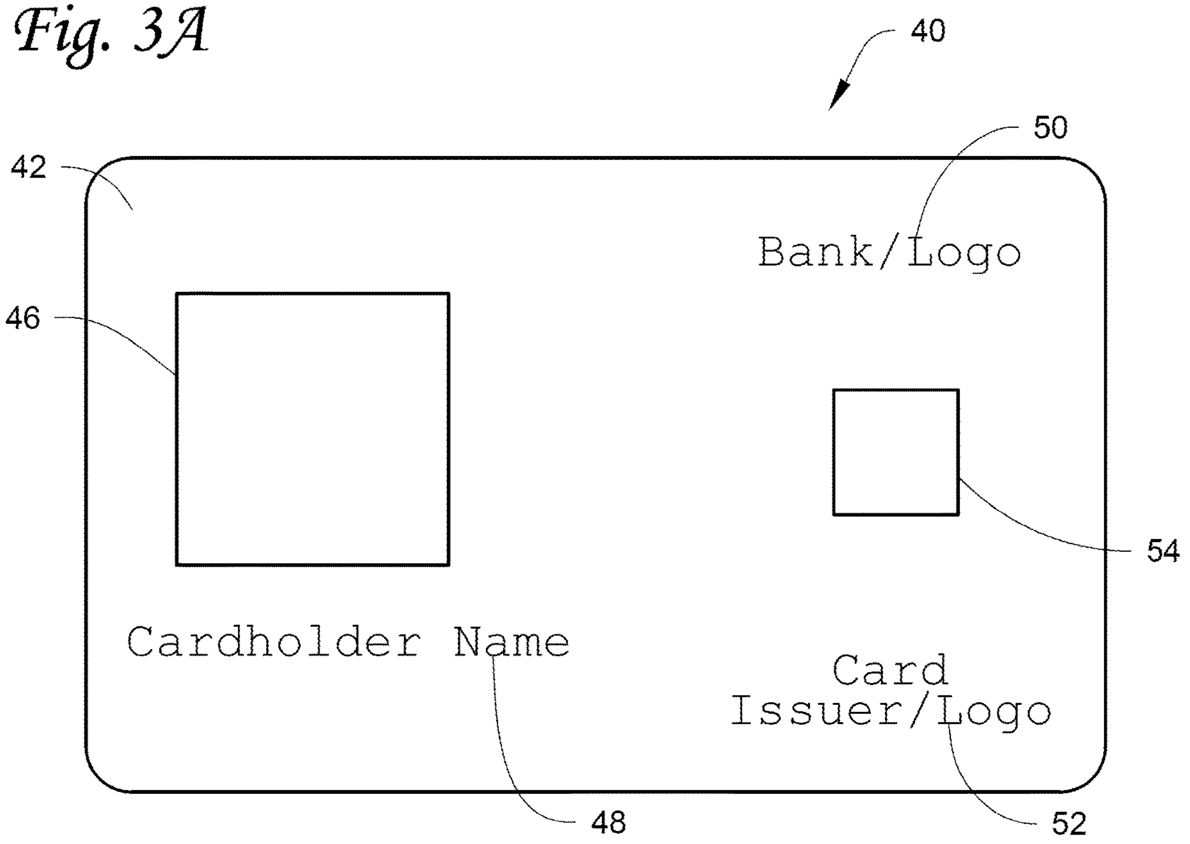
FIG. 3A is a view of an example of a front surface of a personalized plastic document in the form of a plastic card.
Figure 3B:
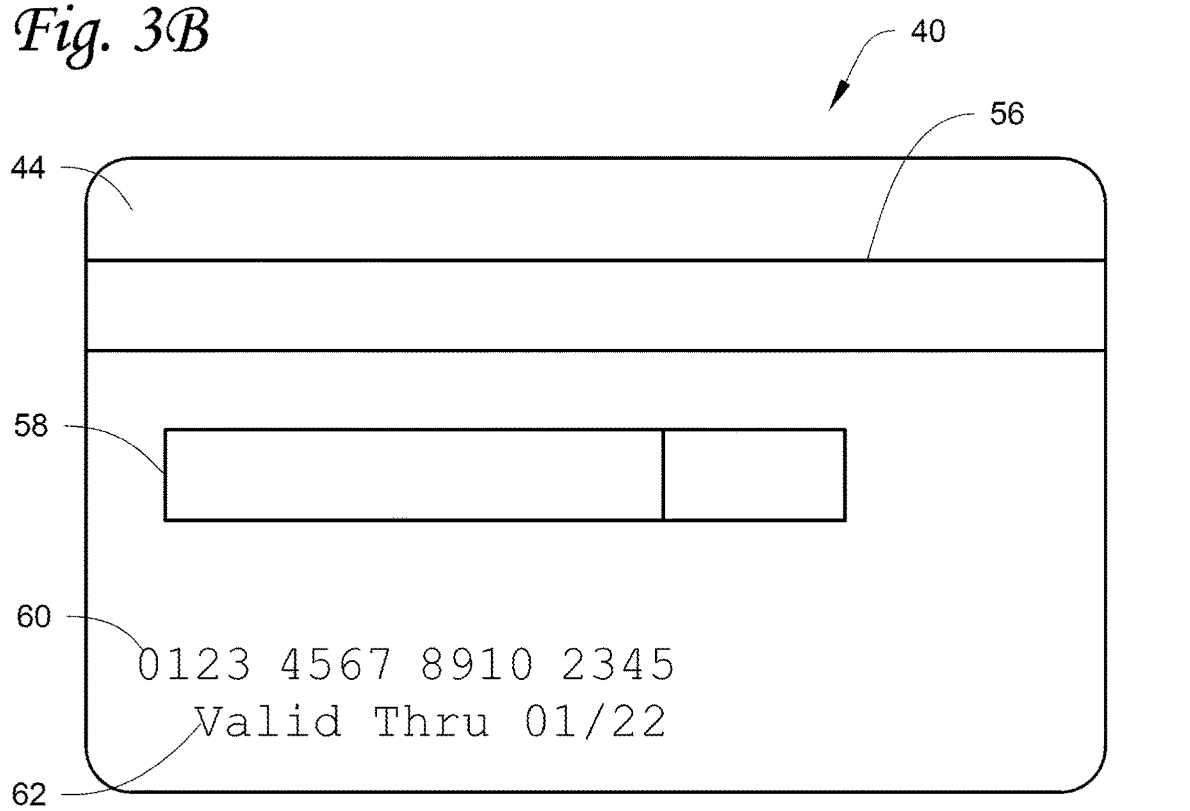
FIG. 3B is a view of an example of a rear surface of a personalized plastic document in the form of a plastic card.

FIGS. 3A and 3B illustrate an example of a plastic card 40. In this example, the card 40 is shown to include a front or first surface 42 (FIG. 3A) and a rear, back or second surface 44 (FIG. 3B) opposite the front surface 42. The card 40 may be printed on one side only (referred to as simplex printing), for example on the front surface 42 or the rear surface 44, or printed on both sides (referred to as duplex printing), for example on each of the front surface 42 and the rear surface 44.

Many possible layouts for the front surface 42 are possible. For example, the front surface 42 can include a horizontal card layout, a vertical card layout, and other known layout configurations and orientations. In the illustrated example in FIG. 3A, the front surface 42 can include various printed cardholder data such as a printed portrait image 46, the cardholder name 48, and account information such as account number, expiration date and the like. The front surface 42 can also include other printed data such as printed information 50 of the entity that issued the card 40, such as the corporate name and/or logo of the issuing bank (for example, STATE BANK), and/or printed information 52 of the card brand name (for example, VISA®, MASTERCARD®, DISCOVER®, etc.). The front surface 42 may also include a contact or contactless integrated circuit chip 54 that can store various data relating to the card 40 such as an account number and/or name of the cardholder.

Referring to FIG. 3B, many possible layouts for the rear surface 44 are possible which may or may not have a similar layout as the front surface 18. For example, the rear surface 44 can include a horizontal card layout, a vertical card layout, and other known layout configurations and orientations. In the illustrated example in FIG. 3B, the rear surface 44 can include a magnetic strip 56 that stores various data relating to the card 40 such as an account number or name of the cardholder, a signature panel 58 that provides a place for the cardholder to sign their name, and a hologram. The magnetic strip 56, the signature panel 58, and the hologram are conventional elements found on many plastic cards. The rear surface 44 can also include printed personal data that is unique to or assigned specifically to the cardholder. For example, an account number 60 assigned to the cardholder, the name of the cardholder, and a card expiration date 62 can be printed on the rear surface 44. Other personal cardholder data may also be printed on the rear surface 44, such as an image of the face of the cardholder. Non-personal data such as the name of the issuing bank, contact information to contact the issuing bank, and the like, can also be printed on the rear surface 44. The printing 46, 48, 50, 52, 60, 62 may each individually be referred to as a printed image or printed data.

Some or all of the printing on the front surface 42 and/or the printing on the rear surface 44 is at least partially overlapped or completely overlapped by a radiation curable material that is applied in the print station 16. Once the radiation curable material is cured, the durability (for example, abrasion resistance, chemical resistance, and adhesion) of the printing compared to the durability of printing that is not overlapped by radiation cured material is increased or enhanced. The enhanced durability is sufficient to permit the plastic card 40 to be issued to the cardholder without a protective laminate or coating applied over the entire front surface 42 and/or over the entire rear surface 44. In other words, the front surface 42 and/or the rear surface 44 can be without or devoid of a protective laminate or coating overlaying the entire front surface 42 and/or overlaying the entire rear surface 44. However, in an embodiment, a protective laminate or coating can be applied to overlay the entire front surface 18 and/or the entire rear surface 20.

Figure 4:
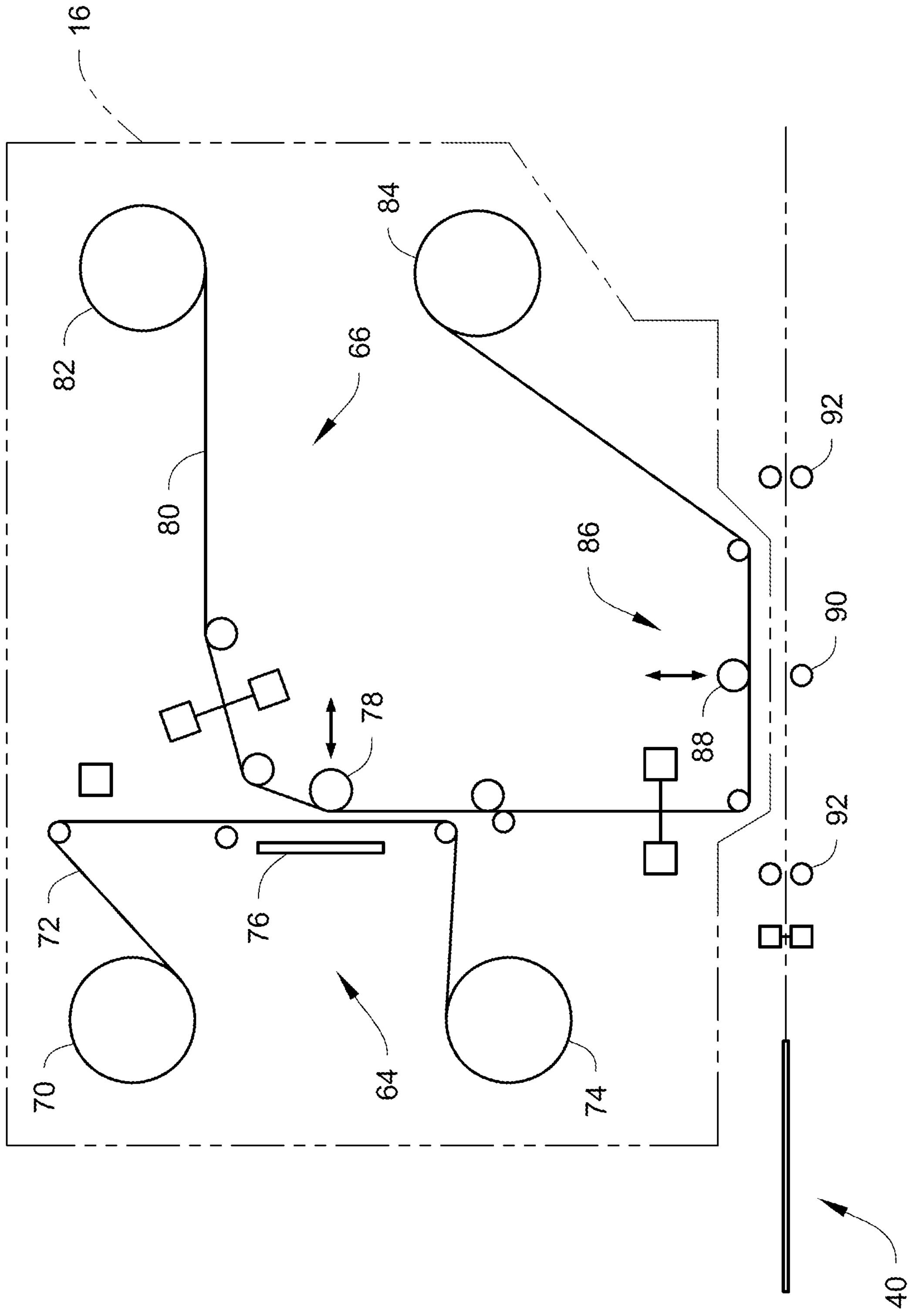
FIG. 4 depicts an example of a print station of the personalized document processing system.

FIG. 4 illustrate an example of the print station 16 that can be used in the systems 10, 30 of FIGS. 1 and 2. Referring to FIG. 4, the print station 16 is configured as a retransfer printer that performs retransfer printing on the plastic card 40. In retransfer printing, instead of printing directly on the plastic card 40, the printing is initially performed on a transferrable material of a retransfer film which is then transferred to the plastic card 40. Retransfer printing and the general construction of retransfer card printers is well known in the art.

The print station 16 includes a print side 64 and a retransfer side 66. The print side 64 includes a print ribbon supply 70, a thermal transfer print ribbon 72, a print ribbon take-up 74, a thermal print head 76, and a platen 78. The ribbon supply 70 supplies the thermal transfer print ribbon 72, and the ribbon take-up 74 takes-up used portions of the thermal transfer print ribbon 72 after printing. The print ribbon 72 is transferred along a ribbon path between the ribbon supply 70 and the ribbon take-up 74 past the thermal print head 76 that can be moved toward and away from the opposing platen 78, which may be fixed, to sandwich the print ribbon 72 and the card 40 therebetween during printing on the retransfer film. Alternatively, the platen 78 can be movable toward and away from the print head 76 which can be stationary.

The retransfer side 66 includes a retransfer film 80 that is supplied from a retransfer film supply 82 and used retransfer film is wound up on retransfer film take-up 84. The retransfer film 80 follows a path past the print head 76 where printing takes place on the transferrable print receptive material of the retransfer film 80. The retransfer film 80 with the printing thereon is then advanced to a transfer station 86 where the transferrable print receptive material with the printing thereon and a transferrable radiation curable material is transferred from the retransfer film 80 and laminated onto the card 40 using a heated transfer roller 88 and a platen 90. After transferring the transferrable material with the printing and the radiation curable material, the used retransfer film 80 is wound onto the take-up 84. The card can be transported within the print station 16 using transport rollers 92 or other transport mechanisms.

The thermal transfer print ribbon 72 (or just print ribbon 72) that is used with the print station 16 in FIG. 4 to print on the print receptive material of the retransfer film 80 can include a repeating sequence of panels of thermally transferrable color material, which may be dye-based ink or pigment ink, for forming the printing. The print ribbon 72 may be referred to as a panelized print ribbon. In an embodiment, the thermally transferrable color material may also be radiation curable.

Figure 5:
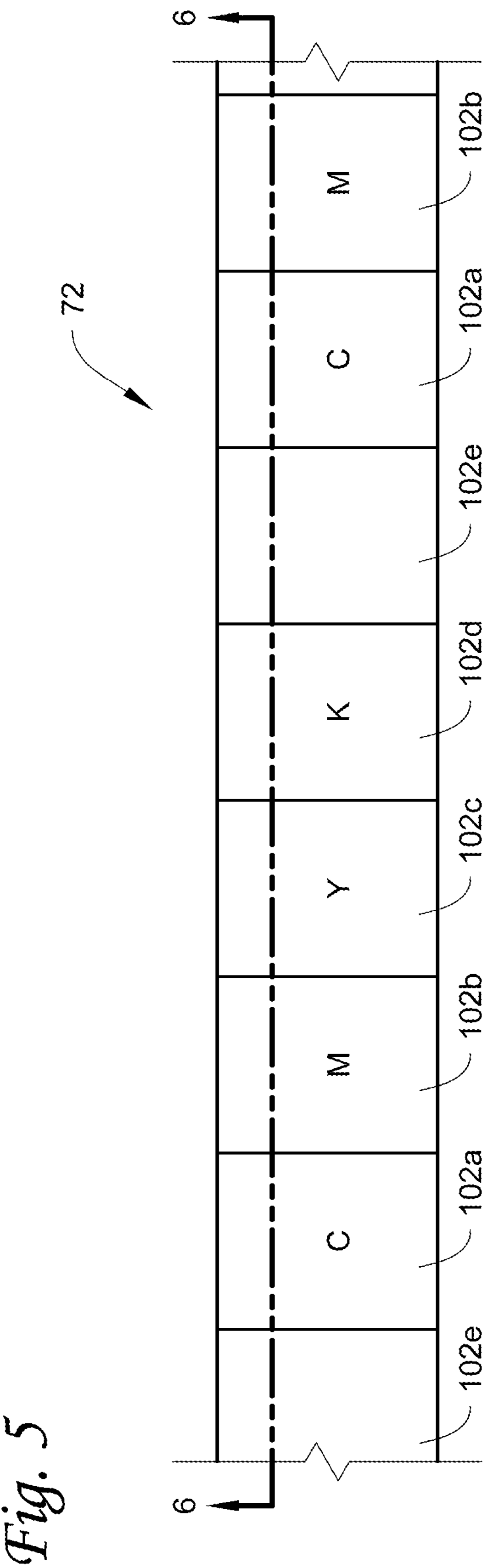
FIG. 5 is a top view of a portion of a print ribbon that can be used in the print station of FIG. 4.
Figure 6:
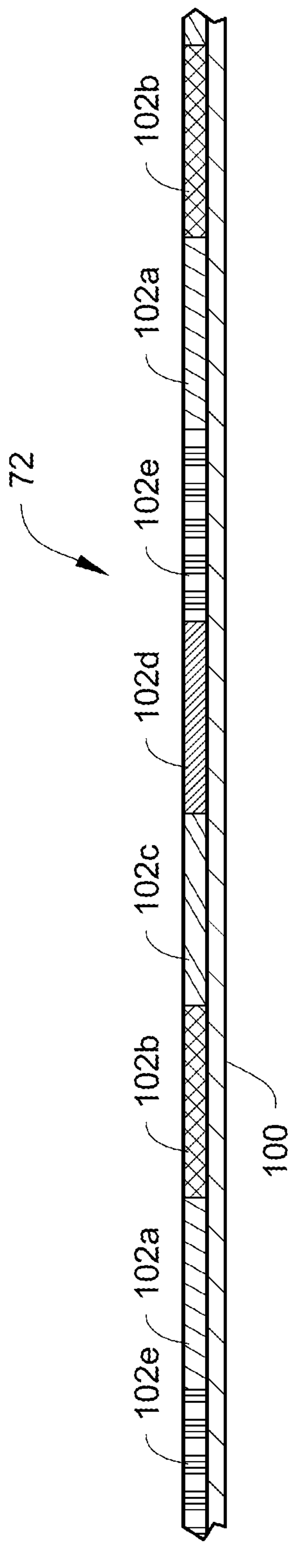
FIG. 6 is a cross-sectional view taken along line 6-6 of FIG. 5.

Referring to FIGS. 5 and 6, a specific example of the thermal transfer print ribbon 72 that can be used with the print station 16 in FIG. 4 illustrated. The ribbon 72 includes a carrier film 100 (FIG. 6), and a repeating sequence of panels of thermally transferrable color material including a cyan (C) dye/pigment ink panel 102*a*, a magenta (M) dye/pigment ink panel 102*b*, a yellow (Y) dye/pigment ink panel 102*c*, and a black (K) dye/pigment ink panel 102*d*. Each sequence of panels can optionally include one or more panels 102*e* of additional material such as a primer material, receptor material, peel-off material, inhibitor material, and/or a panel of fluorescent material or other color or security materials. In another embodiment, the print ribbon 72 can be a monochromatic ribbon with a single color material such as black, silver, gray, white, yellow, magenta, or cyan.

In another embodiment, the print station 16 can include multiple print heads each of which is associated with a monochromatic print ribbon of a particular color, and the image/data is printed by directing the retransfer film past each one of the print heads. This type of printing with multiple print heads and monochromatic print ribbons is known in the art.

In the example of FIGS. 5 and 6, the print ribbon 72 is used to form the printing on the print receptive material of the retransfer film 80. For example, the CMY panels 102*a-c* can be used to form the printed portrait image 46 (FIG. 3A) of the intended cardholder, while the K panel 102*d* can be used to print other cardholder data such as the cardholder name 48 (FIG. 3A).

Figure 7:
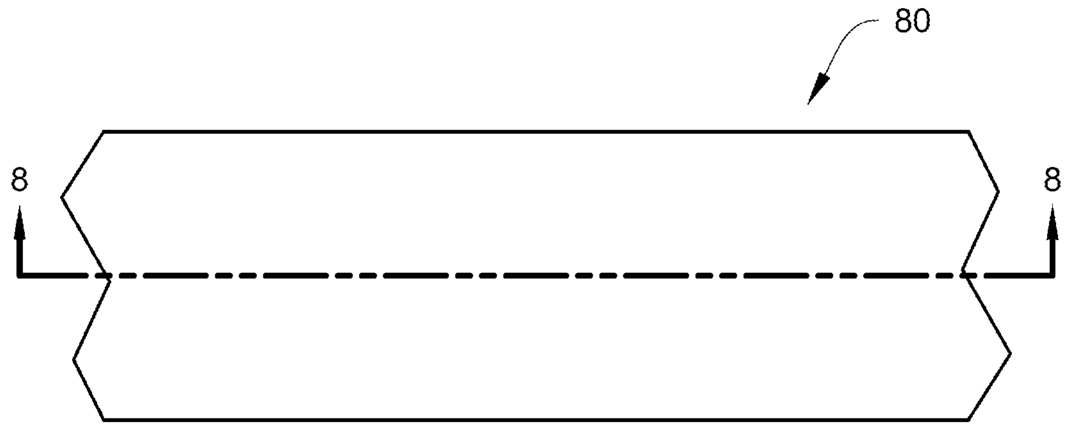
FIG. 7 illustrates a portion of a portion of a retransfer film that can be used in the print station of FIG. 4.
Figure 8:
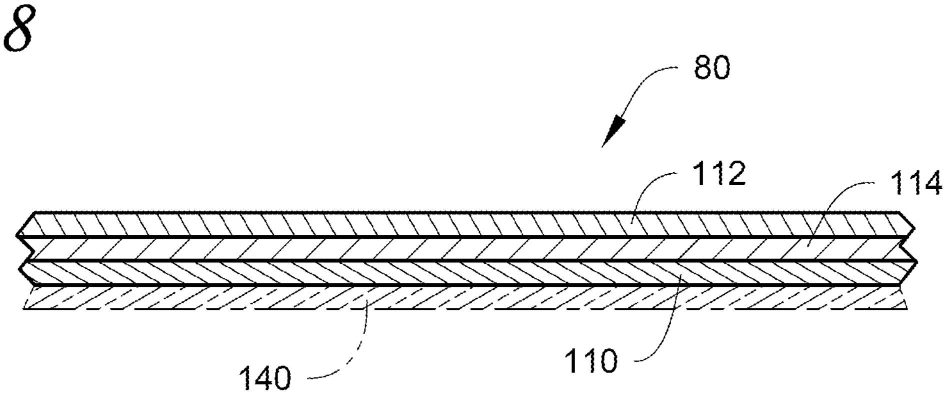
FIG. 8 is a cross-sectional view taken along line 8-8 of FIG. 7.

FIGS. 7-8 illustrate an example of the retransfer film 80 that can be used with the print station 16 in FIG. 4. In this example, the retransfer film 80 is depicted as including a carrier film 110, a transferrable print receptive material 112 and a transferrable radiation curable material 114 on the carrier film 110. The thicknesses of the elements in FIG. 8 are exaggerated in order to better depicts the concepts of the retransfer film 80.

The print receptive material 112 is a material that is suitable for receiving color material from the print ribbon to form the printing on the retransfer film 80. Suitable print receptive materials are known in the art. The radiation curable material 114 is a material that is not cured while on the retransfer film 80, and that after transfer to the card and cured, protects printing that underlies the radiation curable material 114.

In one non-limiting embodiment, the retransfer film 80 can have the following construction. However, other constructions are possible.

Example Retransfer Film Construction

Carrier Film 110:

Materials for the carrier film 110 can include, but are not limited to, polyester, polycarbonate, polyolefin, polyurethane, acetate, and others, individually and in combinations thereof. It is desirable that the carrier film 110 has sufficient heat and dimensional stability during the coating, drying, printing and transfer process. In one embodiment, the carrier film 110 can have a thickness of between about 6.0 microns to about 24.0 microns. In another embodiment, the carrier film 110 can have a thickness of between about 10.0 microns to about 18.0 microns.

Radiation Curable Material 114:

The radiation curable material 114 can include, but is not limited to, a mixture of (i) one or more UV or other radiation curable acrylates, such as urethane acrylates, epoxy acrylates, or acrylate oligomers, individually and in combinations thereof; (ii) one or more thermoplastic vinyls, acrylics, acetates, urethanes, or polyesters, individually and in combinations thereof; and (iii) one or more photoinitiators. Optionally, other additives can be included such as surfactants, wax, stabilizers, and others to improve processing, performance and stability of the retransfer film bearing the radiation curable material 114. Optionally, fillers such as silica, aluminum oxide or others may be added to improve toughness.

A solution of these components is made in a suitable solvent system and coated over the carrier film 110 with conventional coating methods like gravure, wire wound rod or slot die coating. When dried after coating, the layer of radiation curable material 114 should be tack-free or dry to the touch or substantially dry to the touch. This dry to the touch layer is radiation cured after it has been printed and transferred to the desired substrate like a plastic card.

In one embodiment, the radiation curable material 114 can have a thickness of between about 3.0 microns to about 12.0 microns. In another embodiment, the radiation curable material 114 can have a thickness of between about 5.0 microns to about 10.0 microns. The transferred portion of the radiation curable material on the plastic identification document can have a thickness of between about 3.0 microns and about 10.0 microns.

Print Receptive Material 112:

The print receptive material 112 enhances the ink reception during printing process. The print receptive material 112 can additionally have an adhesive component to enhance the adhesion of the print receptive material 112 to the substrate that needs to be printed such as the plastic card.

The print receptive material can be made of a single resin or a mixture of acrylates, polyurethanes, polyesters, vinyls, acetates or epoxies. A solution of the print receptive material composition can be coated with conventional coating methods like gravure, wire wound rod or slot die coating. The print receptive material should be tack-free or dry to the touch or substantially dry to the touch after drying. Optionally, other additives can be added such as surfactants, wax, stabilizers, and others to improve processing. Optionally, fillers such as silica, aluminum oxide or others may be added to improve toughness, ink reception and tack-free surface. The print receptive material can be thermoplastic or curable with heat or radiation.

In one embodiment, the print receptive material 112 can have a thickness of between about 1.0 microns to about 5.0 microns. In another embodiment, the print receptive material 112 can have a thickness of between about 1.0 microns to about 3.0 microns.

Optional Release Layer:

An optional release layer can be provided between the carrier film 110 and the radiation curable material 114 to facilitate the release of the radiation curable material 114 and the print receptive material 112 from the carrier film 110. The optional release layer can include, but is not limited to, a polyester, an acrylic or a wax based coating that can be applied with conventional coating methods like gravure, wire wound rod or slot die coating. The optional release layer may be thermoplastic or cured with heat or radiation.

In one embodiment, the optional release layer may have a thickness of between about 0.1 microns to about 4.0 microns. In another embodiment, the release layer may have a thickness of between about 0.1 microns to about 2.0 microns.

In the example depicted in FIG. 8, the print receptive material 112 is depicted as being a layer that is separate from the radiation curable material 114 which is also a layer. The radiation curable material 114 is disposed between the print receptive material layer 112 and the carrier film 110, with the radiation curable material 114 in direct physical contact with the layer 112 and in direct physical contact with the carrier film 110. However, other constructions are possible.

Figure 9:
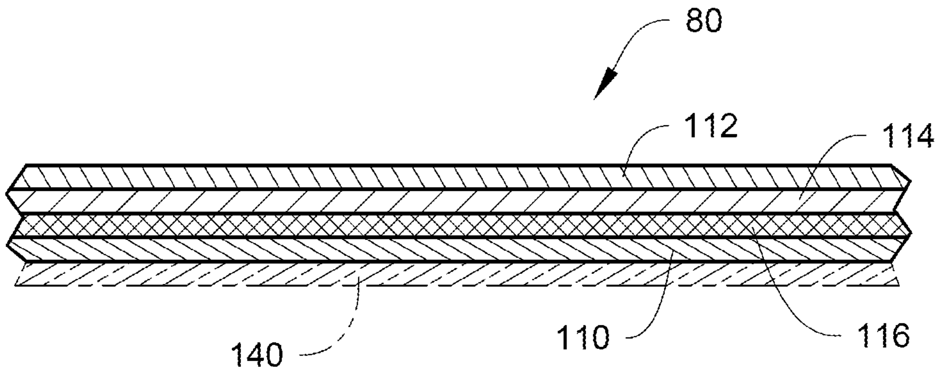
FIG. 9 is a cross-sectional view of another embodiment of the retransfer film.

For example, FIG. 9 illustrates another example of the retransfer film 80 with elements of the film 80 that are the same as or similar to elements in FIGS. 7-8 referenced using the same reference numerals. In FIG. 9, a release layer 116 is provided between the radiation curable material 114 and the carrier film 110. The release layer 116 is provided to facilitate release of the radiation curable material 114 and the print receptive material 112 from the carrier film 110. A similar release layer 116 could be used in the embodiment of FIG. 8 between the layer 114 and the carrier film 110.

Figure 10:
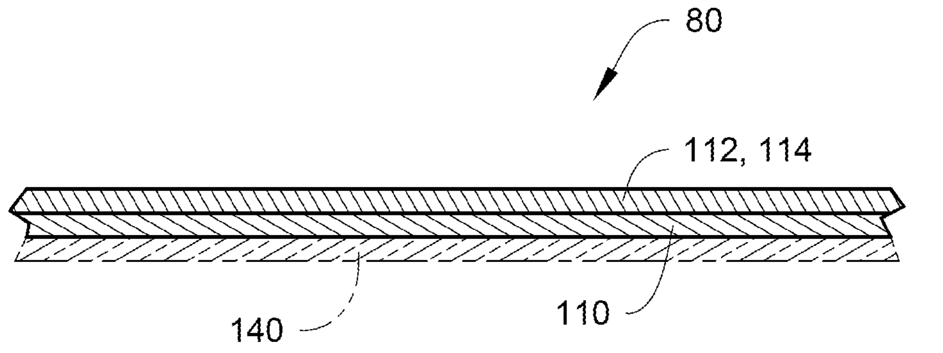
FIG. 10 is a cross-sectional view of another embodiment of the retransfer film.

FIG. 10 illustrates another example of the retransfer film 80 with elements of the film 80 that are the same as or similar to elements in FIGS. 7-9 referenced using the same reference numerals. In FIG. 10, the transferrable print receptive material 112 and the transferrable radiation curable material 114 can be combined together so that they are not discrete, separate layers but are instead blended together into what is essentially a homogenous layer. The retransfer film 80 in FIG. 10 can also include a release layer as described above with respect to FIG. 9 between the carrier film 110 and the combined layer 112, 114.

Figure 11:
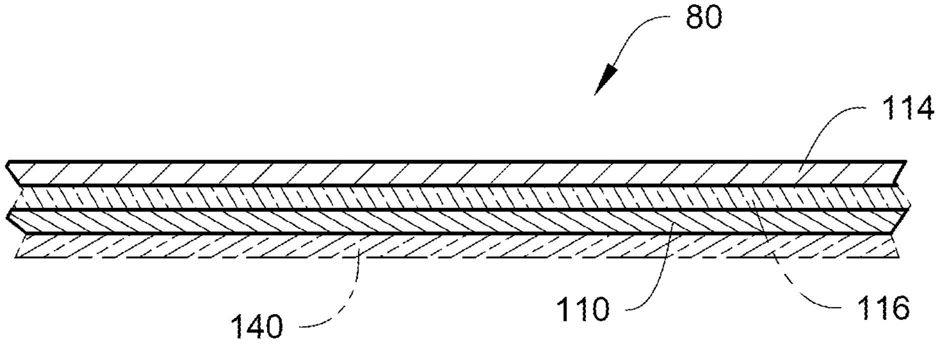
FIG. 11 is a cross-sectional view of another embodiment of the retransfer film.

FIG. 11 illustrates an embodiment of the retransfer film 80 that includes the carrier film 110, the radiation curable material 114 layer, and optionally the release layer 116. In this embodiment, which may be referred to as a single layer version of the retransfer film 80, the radiation curable material layer 114 is also formulated to itself be print receptive without requiring the layer 112 or requiring combining with the material of the transferrable print receptive layer 112.

With respect to the single layer version in FIG. 11, in one embodiment the radiation curable material 114 can have the following composition: one or more radiation curable monomers preferably tetrafunctional or greater; one or more photoinitiators; one or more non-functional polymers such as non-functional thermoplastic polymers; one or more acrylate-functional radiation-curable polymers; one or more heat-curable monomers; one or more hydroxy-functional polymers; one or more thermal initiators; and one or more silica sols, nano silicas or nano aluminas.

In an embodiment, the at least one radiation curable monomer can comprise an average functionality of four or larger, or a majority of the at least one radiation curable monomer can have an average functionality of four or larger. In an embodiment, the radiation curable monomer may comprise an acrylic monomer, or an acrylic monomer with hydroxyl functionality, such as, for example, dipentaerythritolhexaacrylate (DPHA).

The photoinitiator(s) that is/are used can include, but is not limited to, alpha hydroxy ketones and phosphine oxides, or combinations thereof.

Polyester, vinyl copolymers and polyacrylic polymers are examples of non-functional thermoplastic polymers that can be used individually or in combination. These components aid in overall film formation and adhesive properties of the radiation curable material 114.

The acrylate-functional radiation-curable polymers that can be used include, but are not limited to, urethane acrylates, epoxy acrylates and acrylated acrylics.

Hydroxy-functional polymers that can be used are polymers comprising hydroxyl groups that are capable of reacting with reactive groups on heat curable monomers, such as, for example, ether groups, to form covalent bonds. Examples of hydroxy-functional polymers that can be used include, but are not limited to, polyacrylic polyols, cellulose ester polyols, polyether polyols, polyester polyols and polyvinyl alcohols.

Examples of heat curable monomers that can be used include, but are not limited to, monomers with one or more ether groups such as, one, two, three, or more ether groups. The ether groups may, for example, include one or more methoxy, ethoxy, or other groups. The ether groups may react with other functional groups such as, for example, hydroxyl groups, or they may react with other ether groups. Such reactions may result in polymerization or cross-linking. Heat-curable monomers with aromatic or heteroaromatic rings, such as, for example, functionalized melamine monomers, may provide improved coating compatibility with such substrates as polyethylene terephthalate. Hexamethoxymethylmelamine (HMMM) is one non-limiting example of a heat-curable monomer that can be used.

The thermal initiator(s) promotes polymerization and cross-linking reactions. An example of a thermal initiator that can be used is para-toluene sulfonic acid (PTSA).

The radiation curable material 114 in FIG. 11 may also include one or more organic solvents. The organic solvent(s) may be used for such purposes as controlling solution viscosity, improving wetting and substrate coating. Examples of organic solvents that can be used include ketones, esters, and alcohols, such as, for example, methyl ethyl ketone, butyl acetate and isopropanol.

The radiation curable material 114 in FIG. 11 may also include natural or synthetic waxes to increase surface slip of the single layer.

The radiation curable material 114 in FIG. 11 may also include one or more reactive silanes which act as a coupling agent for silica sols and the heat-curable monomer to improve tensile properties of the single layer.

The radiation curable material 114 is preferably transparent or translucent before and after curing. Alternatively, the radiation curable material 114 may be opaque after curing (and optionally prior to being cured). The radiation curable material 114 may also include security features therein such as fluorescent material and/or an optical variable device such as a hologram.

The retransfer film 80 may also optionally include a back coat 140 (depicted in broken lines in FIGS. 8-11). The back coat 140 may also be referred to as a back coat layer. The back coat 140 prevents the print receptive material 112 (or the combined print receptive material 112 and the radiation curable material 114 of FIG. 10, or the single layer radiation curable material 114 of FIG. 11) from sticking to the carrier film 110 when the retransfer film 80 is wound into a roll form. The back coat 140 can have any formulation that is suitable to prevent such sticking from occurring. The back coat 140 can be formed from a radiation cured material(s) or thermally cured material(s). In an embodiment, the back coat 140 is preferably a thermally cured material(s). For example, the thermally cured material can include one or more heat-curable monomer(s); one or more hydroxy-functional polymer(s); and one or more thermal initiator(s).

Examples of heat curable monomers that can be used include, but are not limited to, monomers with one or more ether groups such as, one, two, three, or more ether groups. The ether groups may, for example, include one or more methoxy, ethoxy, or other groups. The ether groups may react with other functional groups such as, for example, hydroxyl groups, or they may react with other ether groups. The reactions may result in polymerization or cross-linking. Heat-curable monomers with aromatic or heteroaromatic rings, such as, for example, functionalized melamine monomers, may provide improved coating compatibility with substrates as polyethylene terephthalate. Hexamethoxymethylmelamine (HMMM) is a non-limiting example of a heat-curable monomer that can be used.

Hydroxy-functional polymers are polymers comprising hydroxyl groups that are capable of reacting with reactive groups of heat curable monomers, such as, for example, ether groups, to form covalent bonds. Examples of hydroxy-functional polymers that can be used include, but are not limited to, polyacrylic polyols, cellulose, ester polyols, polyether polyols, polyester polyols and polyvinyl alcohols.

The thermal initiator(s) promotes polymerization and cross-linking reactions. An example of a thermal initiator hat can be used includes, but is not limited to, para-toluene sulfonic acid (PTSA).

The back coat 140 may also include one or more organic solvents. The organic solvent(s) may be used to control solution viscosity, improve wetting and substrate coating. Examples of organic solvents that may be included in the back coat 140 include, but are not limited to, ketones, esters, and alcohols, such as, for example, methyl ethyl ketone, butyl acetate and isopropanol.

In an embodiment, the back coat 140 can include one or more surfactants to improve wetting. An example of a surfactant that can be used is a hydroxyl-functional polysiloxane. Hydroxyl-functional polysiloxane is suitable for a heat-cured coating because they will form covalent bonds with heat-cured monomers during the drying process at elevated temperatures, resisting migration of surfactant molecules to the print receptive material 112 on the carrier film 110 under long-term storage conditions when the retransfer film 80 is wound into a roll.

Additional examples of constructions of the retransfer film 80 include, but are not limited to, the following:

receptive layer 112. In Examples 1, 2, 6 and 7, the material of the curable layer 114 on the card is cured directly, while in Examples 3 to 5 the material of the curable layer 114 on the card is cured through the release layer 116. In Examples 3, 4 and 5, the release layer 116 transfers with the curable layer 114 to the card. However, the release layer 116 can be designed to stay on the carrier film 110 (i.e. not transfer to the card) so that only the curable layer 114 by itself or along with the print receptive layer 112 gets transferred to the card.

In the case of a retransfer film having the carrier film, the release layer 116, the radiation curable layer 114, and the back coat 140 (for example as in Example 5 in the table above), the following formulation can be used:

The carrier film can have a construction as described above.

Radiation curable layer: a radiation curable acrylic macromer in solvent; one or more solid acrylic resins with glass transition temperatures (Tg) of about 75° C. or greater, and molecular weights (MWt) ranging from about 32500; to about 410000; radiation curable, multifunctional urethane acrylate oligomer; carnauba wax; nano silica; and one or more photoinitiators.

Release layer: acrylic resin with a MWt of about 20,000 and a Tg of about 113° C. In another embodiment, the release layer can be a polyester, wax, silicone or other resins that get transferred with the radiation curable layer during the retransfer process. Such resins have a higher affinity for the radiation curable material than for the carrier so they release easily. Alternatively, a resin system can be used that has a higher affinity for the carrier than it does for the radiation curable material and would not release easily from the carrier nor transfer with the radiation curable material during the retransfer process. An example of such a resin system is a melamine system that serves as a back coat in this embodiment.

Back coat: a melamine or other material as described above for the back coat 140.

Once the image/data is printed on the print receptive material of the retransfer film, and the print receptive material bearing the printed image/data and the radiation curable material are simultaneously transferred from the retransfer film to the card surface, the card is then transported to the curing station 18 and radiation is applied to the radiation curable material to cure the radiation curable

| Layers | Example 1 | Example 2 | Example 3 | Example 4 | Example 5 | Example 6 | Example 7 |
|---|---|---|---|---|---|---|---|
| 1 | | | | Back coat 140 | Back coat 140 | Back coat 140 | Back coat 140 |
| 2 | Carrier 110 | Carrier 110 | Carrier 110 | Carrier 110 | Carrier 110 | Carrier 110 | Carrier 110 |
| 3 | | | Release layer 116 | Release layer 116 | Release layer 116 | | |
| 4 | Curable layer 114 | Curable layer 114 | Curable layer 114 | Curable layer 114 | Curable layer 114 | Curable layer 114 | Curable layer 114 |
| 5 | | Print receptive layer 112 | Print receptive layer 112 | Print receptive layer 112 | | Print receptive layer 112 | |

In the table above, Example 1 can be referred to as a single layer system that can have a formulation as described above with respect to FIG. 11. Example 1 can optionally include the release layer 116 and/or the back coat 140. Examples 2-7 may be referred to as multi-layer systems. In Examples 1, 5 and 7, the desired image is printed onto the curable layer 114 which is also pint receptive, while in Examples 2, 3, 4 and 6 the image is printed onto the print material. The radiation used to cure the radiation curable material can be any radiation that is suitable for curing the radiation curable material. For example, in one embodiment, the radiation can be UV radiation. Once cured, the cured material protects the underlying printing and increases the durability of the underlying printing.

Referring to FIG. 12, along with FIGS. 1-2 and 4, a method 120 of processing a plastic identification document in a personalized identification document processing system is illustrated. In a step 122, the plastic identification document to be processed is input onto a document transport path. At 124, the plastic identification document is thereafter transported into the print station located along the document transport path. At 126, color material is thermally printed from the print ribbon onto the print receptive material of the retransfer film in the print station to form the printed image/data on the print receptive material of the retransfer film. Thereafter, at 128, the retransfer film is advanced to bring the printed image/data to the transfer station and the print receptive material bearing the printed image and the radiation curable material are simultaneously transferred to the surface of the plastic identification document. At 130, the identification document is then transported into the radiation curing station along the document transport path, and radiation is applied to cure the radiation curable material overlying the printed image/data. Thereafter, at 132, the plastic identification document is transported to a document output and the plastic identification document is output.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A personalized identification document processing system, comprising:

a document input that is configured to input an identification document to be processed onto a document transport path to create a personalized identification document;

a print station along the document transport path, the print station includes: a retransfer film with a carrier film, and a transferrable radiation curable material that is dry to the touch or substantially dry to the touch before curing on the carrier film; a thermal print head; a print ribbon that is engageable by the thermal print head to thermally transfer thermally transferrable color material from the print ribbon to the retransfer film; and a transfer station that is configured to simultaneously transfer at least a portion of the transferrable radiation curable material from the retransfer film to the identification document;

a radiation curing station along the document transport path that is configured to receive the identification document and apply radiation to the portion of the radiation curable material on the identification document to cure the transferred portion of the radiation curable material on the identification document;

a document output along the document transport path that is configured to receive the identification document after radiation curing in the radiation curing station;

a document transport mechanism that is configured to transport the identification document along the document transport path.

2. The personalized identification document processing system of claim 1, wherein the transferrable radiation curable material is print receptive.

3. The personalized identification document processing system of claim 1, wherein the retransfer film further comprises a print receptive layer, wherein the transferrable radiation curable material is disposed between the print receptive layer and the carrier film.

4. The personalized identification document processing system of claim 1, wherein the identification document comprises a plastic, paper/carboard or metal identification card.

5. The personalized identification document processing system of claim 3, wherein the retransfer film further comprises a release layer that is disposed between the carrier film and the transferrable radiation curable material.

6. The personalized identification document processing system of claim 1, further comprising a back coat on the carrier film.

7. The personalized identification document processing system of claim 1, wherein the thermally transferrable color material comprises black, silver, gray, white, yellow, magenta, or cyan.

8. The personalized identification document processing system of claim 1, wherein the transferrable radiation curable material is transparent or translucent.

9. The personalized identification document processing system of claim 1, wherein the transferred portion of the radiation curable material on the identification document has a thickness of between about 3.0 microns and about 10.0 microns.

10. A method of processing a an identification document in a personalized identification document processing system, comprising:

inputting the identification document to be processed onto a document transport path;

transporting the identification document into a print station located along the document transport path, the print station includes: a retransfer film with a carrier film and a dry to the touch or substantially dry to the touch transferrable radiation curable material on the carrier film; a thermal print head; a print ribbon that is engageable by the thermal print head to thermally transfer thermally transferrable color material from the print ribbon to the retransfer film; and a transfer station that is configured to simultaneously transfer at least a portion of the transferrable radiation curable material from the retransfer film to the identification document;

printing data on the retransfer film by using the thermal print head to transfer thermally transferrable color material from the print ribbon to the retransfer film, and thereafter simultaneously transferring the printed data and at least a portion of the radiation curable material from the retransfer film to the identification document;

thereafter transporting the identification document into a radiation curing station along the document transport path, and applying radiation to the portion of the radiation curable material on the identification document to cure the portion of the radiation curable material;

thereafter transporting the identification document to a document output and outputting the identification document.

11. The method of claim 10, comprising printing the data on the radiation curable material.

12. The method of claim 10, comprising printing the data on a print receptive layer on the retransfer film, wherein the transferrable radiation curable material is disposed between the print receptive layer and the carrier film.

13. The method of claim 10, comprising applying ultraviolet radiation to the portion of the radiation curable material to cure the portion of the radiation curable material.

14. The method of claim 10, further comprising a back coat on the carrier film.

15. The method of claim 10, wherein the thermally transferrable color material comprises black, silver, gray, white, yellow, magenta, or cyan.

16. The method of claim 10, wherein the transferrable radiation curable material is transparent or translucent.

* * * * *